United States Patent
Holyoak et al.

(10) Patent No.: US 6,428,588 B1
(45) Date of Patent: Aug. 6, 2002

(54) FILTER CLEANING APPARATUS

(76) Inventors: David Holyoak; Christine Holyoak, both of 41 Carnation Close Parish Fields Rush Green, Romford Essex RM70XQ (GB)

( * ) Notice: Subject to any disclaimer, the term of this patent is extended or adjusted under 35 U.S.C. 154(b) by 0 days.

(21) Appl. No.: 09/605,491

(22) Filed: Jun. 28, 2000

(51) Int. Cl.[7] .............................................. B01D 46/04
(52) U.S. Cl. ............................ 55/293; 55/302; 55/303; 95/278; 134/153; 134/157
(58) Field of Search ......................... 55/293, 294, 300, 55/301, 302, 303; 95/278, 279; 134/33, 153, 157

(56) References Cited

U.S. PATENT DOCUMENTS 2,406,931 A * 9/1946 Troxler ......................... 55/294
3,998,656 A * 12/1976 Grotto ......................... 134/153
4,704,144 A * 11/1987 LeBlanc et al. ............... 55/300
5,114,444 A * 5/1992 Stuble .......................... 55/294
5,143,529 A * 9/1992 Means, Jr. .................... 55/294
5,584,900 A * 12/1996 Zaiser et al. ................... 55/294
6,021,785 A * 2/2000 Grutzediek et al. ......... 134/157

* cited by examiner

Primary Examiner—David A. Simmons
Assistant Examiner—Minh-Chau T. Pham
(74) Attorney, Agent, or Firm—Michael Y. Epstein

(57) ABSTRACT

The present invention is concerned with the cleaning of fouled air filters to alleviate the problems caused by disposal of such filters as waste and to reduce the cost of maintenance of the many apparatus requiring air filters. The present invention provides a motorized turntable provided in a filter chamber in a housing whereby the fitter can be spun on its axis at a speed sufficient to discharge the fouling into the filter chamber. The fouled atmosphere in the filter chamber is exhausted to a vacuum chamber where the fouling settles out for disposal.

18 Claims, 1 Drawing Sheet

FILTER CLEANING APPARATUS

Figure 1:
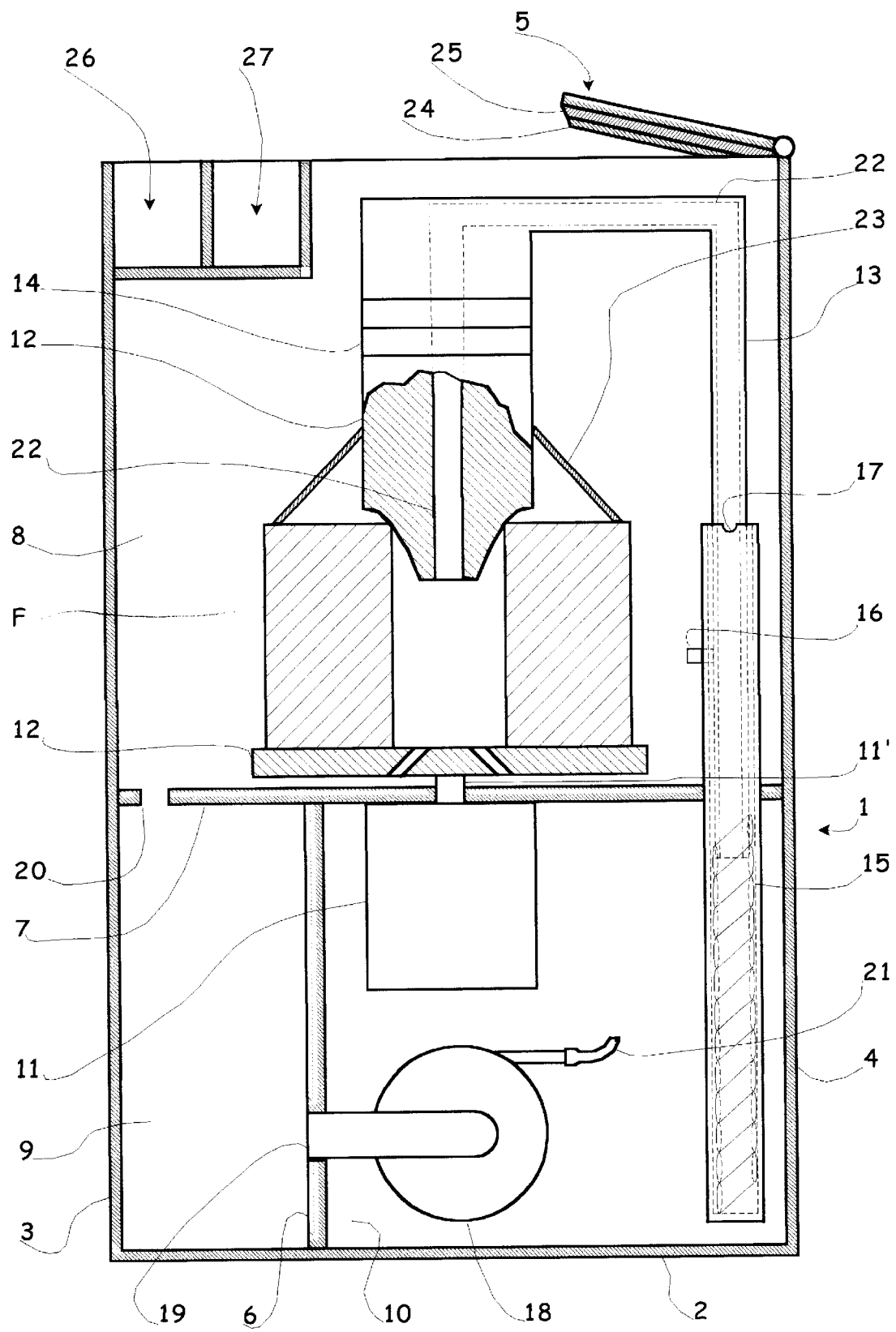

This invention relates to cleaning of filters and in particular to a method and apparatus for cleaning air filters.

Air filters for domestic or industrial or vehicle air-conditioning equipment or for vehicle engines are generally of concertina or fan-folded paper or card formed into a cylindrical, conical or cube-like hollow core form open at each end. Some air filters are of foamed plastics material instead of paper or card. Whatever their composition, when such air filters become clogged they are removed and replaced by clean ones, Usually, and especially for vehicles, the clean filters used are brand new, and-the used air filters that are clogged by embedded particles in its wall are discarded and disposed of as a waste product.

Filter cleaning apparatus has been proposed, e.g. in U.S. Pat. No. 5584900, U.S. Pat. No. 3499267, U.S. Pat. No. 2406931, U.S. Pat. No. 2765048, U.S. Pat. No. 4154588, U.S. Pat. No. 4289510, U.S. Pat. No. 4704144, U.S. Pat. No. 5114444, U.S. Pat. No. 5143529, U.S. Pat. No. 5584900, U.S. Pat. No. 4842624, U.S. Pat. No. 3998656 and GSA-2174618 whereby air filters can be cleaned either in or after removal from the filtering equipment in which they are used. It is considered that such prior art filter cleaning apparatus have one or more disadvantages: For example they may be restricted to the cleaning of only one filter at a time and/or to the cleaning of filters of only.

One specific size and/or to the use of cumbersome mechanisms including movable suction heads and/or impacting heads to engage the surface of the filter to be cleaned. They are often time consuming to set up and/or are slow in effecting the intended cleaning operation A. particular problem which has not been satsfactorily addressed by the prior art filter cleaners is the elimination of vibration at caused by whirling as the filter spins. Experience shows that this effect is both alarming for the operator due to the noise and shaking of the machine, and causes damage to the filter and severe wear on the apparatus. Apparatus such as that disclosed in GB-A-2174618 rely mainly upon the delivery of high pressure air to the core of the spinning filter in order to clean the filter. This requires the provision of a high pressure air source and associated conduits to deliver the compressed air to the core of the filter. The core must be well sealed to prevent leakage and communication of the compressed air with the core is complicated by the requirement for seals around the deliver conduits.

It is an object of the present invention to provide a compact, economic, dry, filter cleaning apparatus which alleviates the disadvantages mentioned with reference to the prior art and so allows air filters to be reliably cleaned and recycled in order to reduce wastage and costs.

Accordingly the present invention provides apparatus for cleaning a hollow form filter comprising a housing defining a filter chamber, a rotatable deck to support one axial end of the filter, bearing means mounted on a swing arm which can be lifted and swung away from the axis of rotation of the filter to allow convenient insertion and removal of the filter in the filter chamber said bearing means rotatably mounting a spindle of conic shape for vertical movement to be received into the hollow axis of the filter to ensure alignment of the axis of rotation of the spindle, the deck and the filter, a motor coupled to rotate the deck and capable of a speed sufficient to discharge fouling into the filter chamber, and means to exhaust the fouling from the chamber.

Further according to the second aspect of the present invention there is provided a method of cleaning a hollow form filter comprising the steps of: spinning a fouled hollow form filter on its axis at a speed in the range of 750–1500 rpm sufficient to discharge the fouling from the filter, delivering a high pressure air flow to the hollow core of the filter and effectively sealing the top and base of the filter to expedite the discharge of fouling, isolating the filter and discharged fouling in a filter chamber of a housing and exhausting the discharged fouling from the filter chamber for collection and disposal, inducing a vacuum which sucks air and discharged fouling from the filter chamber to settle in a vacuum chamber.

Apparatus for and a method of cleaning a filter, embodying the present invention will now be described, by way of example only, with reference to the accompanying drawings, in which:

FIG. 1 is a sectional elevation of the apparatus.

The filter cleaning apparatus of this embodiment is for the cleaning of used hollow air filters that are out-of service, i.e. they have been removed from the equipment in which they had been installed to filter air passing therethrough.

The apparatus has a housing comprising a base 2, side walls (not shown), a front wall 3 and a rear wall 4 are upstanding from the base and a lid 5 is mounted by means of a hinge on the top end of the rear wall 4 in order to allow the lid to be swung open and closed. A latch (not shown) may be provided to act between the lid and the front wall In order to secure the lid or other devices such as spring means may be provided to hold the lid tightly dosed during operation. The side and end walls may also be, provided with access hatches (not shown) for access to the interior of the housing 1 for maintenance and the like., The interior of the housing is divided into three chambers by means of an interior wall panel 6 extending up from the base panel and a floor panel 7 which overlies the interior wall panel 6. The chambers so formed include a filter chamber 8 formed in the top of the housing overlying the floor panel 7, a vacuum chamber 9 and a motor chamber 10 occupying the volume beneath floor panel. The panels from which the housing Is formed may be of any appropriate material including for example wood, metal sheet or preferably plastics composite.

An electric motor 11 is mounted beneath the floor panel 7 with a drive shaft 11' extending vertically through the floor panel 7 to couple with a turntable 12 arranged to spin around a vertical axis. Bearings and packing seals as required may be provided around the drive shaft where it passes through the floor panel 7. The turntable is of sufficient width to accommodate a wide range of filter sizes Examples include vehicle engine filters such as those for a Leyland Bus engine (Part No. 10906079-V04J24) having an approximate height of 330 mm and an approximate diameter 230 mm, or for a Volvo (Germany) engine (Part No. 1660619) having an approximate height of 355 mm and an approximate diameter of 310 mm, or a Maxicone conically-shaped filter for a Dennis engine (Part No. 651031-1-V11MO8) having an approximate height of 480 mm and an approximate diameter at one end of 255 mm and at the other end of 220 mm.

In use a filter is placed on the turntable co-axial with the turntable. It is essential that the alignment of the axis of the filter and the turntable spin axis is maintained during cleaning else the centripetal forces on the filter and the drive shaft 11' will become asymmetric causing vibration which results in violent and alarming shaking of the machine, noise and severe wear on the bearings supporting. the drive shaft. With this in mind a conic spindle 12 is mounted on a support arm 13 by means of a bearing 14. The support swing arm 13 is "n" shaped having the end of one leg. supporting the spindle 12 while the end of the other leg is received telescopically into a guide sleeve 15 mounted vertically against the back wall 4 of the housing 1. By virtue of this arrangement the conic spindle 12 can be lifted up and away from the rotary axis of the turntable 12 in order to emplace the filter or remove it. The conic shape of the spindle allows the conic part of the spindle to be guided into the hollow core of the filter F. The maximum and minimum diameters of the conic spindle are chosen so that the minimum diameter of the spindle is readily received into the core of most filters while the maximum diameter ensures that the conic surface of the spindle engages an upper rim of the core of the filter so centering the filter. A variety of devices may be used to urge the conic spindle 12 into engagement with the rim of the filter and so to urge the filter into driving engagement with the turntable 12. These urging devices include motors, hydraulics, and pnuematic devices, however the preferred device comprises a spring mounted to act in tension between the end of the swing arm 13 in the sleeve 15 and the base of the sleeve 15. For convenience a pin 16 is secured to project from the arm 13 and to travel in a slot (not shown) formed into the sleeve 15. This ensures that the spindle is accurately centered over the axis when the arm is lowered to engage the core of the filter F. For convenience a notch 17 is formed into the upper rim of the sleeve 15 so that the pin can be lifted out of the slot with the arm 13, the arm rotated and lowered to rest the pin 16 in the notch 17.

The bearing 14 ensures that the spindle 12 can rotate freely with the filter.

With the filter F located on the turntable as described and the lid closed, the motor can spin the turntable at speeds between 750 r.p.m and 1500 r.p.m in order to displace fouling from the filter F. The fouling is discharged from the filter by the centripetal forces acting as the filter spins.

An exhaust system comprises primarily the vacuum chamber 9 and a vacuum pump 18 mounted in the motor chamber 10 and driven to extract air from the vacuum chamber 9 via a port 19 The vacuum pump 18 may be driven by an independent motor or coupled to the turntable motor 11 via drive belts or gears or mounted directly around the drive shaft 11'. At least one port 20 is formed in the floor 7 communicating between the vacuum chamber 9 and the filter chamber so that air carrying fouling flows from the filter chamber to the vacuum chamber where the fouling settles out and can be disposed of later.

Fresh air may be inducted into the filter chamber to provide for the air flow while air discharged from the pump goes to an exhaust. However it is preferable that an exhaust 21 of the vacuum pump 18 communicates through the hollow sleeve IS, with an air passage 22 formed through the swing arm 13 the bearing and the spindle 12 to communicate with the hollow core of the filter F. The air is continuously cycled through the machine avoiding the risk of discharging fouled air to the surroundings which may be unpleasant and possibly hazardous. This also permits the machine to be sealed resulting in quite operation. It should be clearly understood that the air flow around or through the filter is not necessary for cleaning purposes, it is provided to dispose of fouling discharged by spinning the filter.

The vacuum chamber may accommodate a porous bag or similar device for collecting the fouling.

A conic resilient seal 23 is mounted to depend from the spindle so that the free rim of the seal 23 engages the upper surface of the filter F. This prevents compressed air delivered from the pump exhaust 21 from escaping directly into the filter chamber F and so encourages the air to flow through the filter assisting the cleaning process.

In an alternative embodiment (not shown) in the swing arm may consist of a telescopic shaft extending down from the lid 5 and having a compression spring acting between the telescopic part of the shaft and the fixed part which urges the telescopic part, on which is mounted the conic spindle, down into the core of the filter. By this means the closure of the lid automatically causes the conic spindle 12 to engage and center the filter F and urge the filter into driving engagement with the deck 12.

In a further embodiment, not shown, the arm may be pivotally mounted on to the lid and biased away from the lid by the action of a compression spring to push the spindle down into the core.

It is preferable that a control unit is provided to time the operation of the machine to achieve reliable cleaning. More sophisticated machines may include sensors to detect when the discharge of fouling from the filter ceases. For example, a particle sensors similar to smoke sensors may be mounted in the filter chamber, for example at the port 20 to switch off the motor when only clean air passes through the port 20.

The lid 5 has a skirt 24 depending downwardly from all its edges to embrace each upper edge of each side wall of the housing 1. An elastomer seal 25 extends around the inside junction of the skirt 24 and an upper panel of the lid 5 in order to seal the top edge of each side wall and so prevent leakage of any discharged fouling to the environment.

To assist exhaust of fouling, particularly liquid fouling such as oil, through the port 20, the floor panel 7 may be contoured to form drainage channels in and/or around the periphery of the floor panel 7, and/or a perforated exhaust tube (not shown) may be provided extending around the periphery of the floor panel 7 which communicates with the vacuum chamber 9 by means of one or more apertures 20

Although FIG. 1 shows the vacuum chamber 9 and the motor chamber 10 located beneath the filter chamber 8 it may be convenient to locate these elsewhere, such as behind the filter chamber, in order to reduce the height of the apparatus.

A further optional feature of the machine is the provision of a spark plug cleaning facility comprising a sand box 26 and an air box 27. Each spark plug requiring cleaning is first placed into the sand box 26 which is then sealed, in this case by the lid 5. Air from the vacuum pump 18 is then blown through a conduit (not shown) into the sand box, to agitate the sand which loosens spark plug fouling. After a suitable period each spark plug is transferred to the air box 27 through which air is blown to clean sand and loosened fouling from the plug ready for use.

The method of use of the apparatus to clean a filter is as follows. The lid is opened and the swing, arm swung up and out to reveal the deck. Alternatively, where the spindle is mounted via the arm directly onto the lid, the action of lifting the lid will reveal the deck. The spindle is swung back over the center of the deck by the action of the swing arm and lowered so that the conic surface of the spindle engages the rim of the core. Where the swing arm and spindle are lid mounted this is achieved simply by closing the lid. The lid is latched when closed and the motor started. The motor spins the deck up to a speed between 750 and 1500 rpm and drives the vacuum pump simultaneously to generate a vacuum within the vacuum chamber 9 and to deliver compressed air to the core of the filter thus generating an air flow through the filter, the filter chamber and around the filter. The resulting flow forms a curtain around the filter which prevents the deposit of fouling on the filter chamber walls and exhausts the fouling to the vacuum chamber. The motor is run, either for a predetermined period of time or until a particle sensor within the filter chamber ceases to detect significant levels of fouling in the exhaust air. The use of a particle sensor ensures that the filter is thoroughly cleaned without excessive use of time or wear on the machine. The sensor may be used to control the motor via a simple control device so that the motor automatically switches off when the filter is clean.

The method of cleaning and apparatus dry clean the filter, that is to say the filter is cleaned without the use of solvents or detergents or other wet cleaning agents.

What is claimed is:

1. Apparatus for cleaning a hollow form filter comprising:
   a housing defining a filter chamber,
   a rotatable deck to support one axial end of the filter,
   a bearing mounted on a swing arm which can be lifted and swung away from the axis of rotation of the filter to allow convenient insertion and removal of the filter in the filter chamber said bearing rotatably mounting a spindle of conic shape for vertical movement to be received into the hollow axis of the filter to ensure alignment of the axis of rotation of the spindle, the deck and the filter,
   a motor coupled to rotate the deck and capable of a speed sufficient to discharge fouling into the filter chamber, and
   an exhaust system to exhaust the fouling from the chamber.

2. Apparatus according to claim 1 wherein the conic spindle urges the filter into engagement with the rotatable deck in order to couple the filter with the deck by a clamping action so that the filter is spun by the rotating deck and constrained to rotate on its axis.

3. Apparatus according to claim 1 wherein the swing arm is telescopically extensible from a lid of the housing of the apparatus, said lid being hinge mounted to swing the arm, and a spring acting in compression on the arm to extend the arm telescopically in order to urge the spindle into engagement with the filter and urge the filter to engage the deck.

4. Apparatus according to claim 1 wherein the arm is "n" shaped, the spindle being mounted on one down facing leg of the arm to be capable of being swung into and out of engagement with the core of the filter and a spring acting on the arm to urge the spindle to engage the filter and urge the filter into driving engagement with the deck.

5. Apparatus according to claim 1 wherein the housing includes a vacuum chamber and said exhaust system comprises a vacuum pump arranged to produce a vacuum within the vacuum chamber to draw fouled air from the filter chamber into the vacuum chamber.

6. Apparatus according to claim 5 wherein the exhaust from the vacuum pump is returned to the filter chamber via passages in the arm and the spindle to discharge into the core of a filter.

7. Apparatus according to claim 6 wherein a seal member is mounted on the spindle or bearing so that the core of the filter is hermetically sealed from the surrounding filter chamber.

8. Apparatus according to claim 7 wherein the seal member is a hollow cone of resilient material which seals the upper surface of the filter as the spindle is lowered into engagement.

9. Apparatus according to claim 5 comprising a spark plug cleaning facility having a sand box and an air box and a conduit to deliver air from the vacuum pump exhaust to the sand box and the air box.

10. Apparatus according to claim 5 wherein the vacuum chamber is partitioned from the filter chamber by a panel and communicates with the filter chamber via at least one port in the panel.

11. Apparatus according to claim 5 wherein said housing is sealed from the ambient atmosphere and said vacuum pump recirculates air from the vacuum chamber into the filter chamber.

12. Apparatus according to claim 11 wherein said vacuum chamber includes a fouling collecting means, whereby essentially fouling-free air is recirculated from the vacuum chamber to the filter chamber.

13. Apparatus according to claim 1 including a particle sensor to detect the presence or absence of fouling in the filter chamber atmosphere.

14. Apparatus according to claim 13 wherein the particle sensor is coupled to a control device responsive to signals from the sensors indicative of the absence of particles to switch off the motor.

15. A method of cleaning a hollow form filter comprising the steps of:
   spinning a fouled hollow form filter on its axis at a speed in the range of 750–1500 rpm sufficient to discharge the fouling from the filter,
   delivering a high pressure air flow to the hollow core of the filter and effectively sealing the top and base of the filter to expedite the discharge of fouling,
   isolating the filter and discharged fouling in a filter chamber of a housing and exhausting the discharged fouling from the filter chamber for collection and disposal,
   inducing a vacuum which sucks air and discharged fouling from the filter chamber to settle in a vacuum chamber separated from the filter chamber.

16. A method according to claim 15 comprising the steps of sensing discharged fouling in the atmosphere of the filter chamber and stop the process when fouling ceases to be detected.

17. A method according to claim 15 wherein the filter is cleaned dry without the aid of wet cleaning agents.

18. A method according to claim 15 including recirculating fouling free air from the vacuum chamber into the filter chamber and preventing discharge of the circulating air into the ambient atmosphere.

* * * * *